Oct. 25, 1932.  M. G. PARKS  1,884,823
MACHINE FOR FORMING AND APPLYING PLASTIC GASKETS TO JAR CAPS
Filed Oct. 20, 1930   4 Sheets-Sheet 1

Inventor:
Merritt G. Parks.
By Chindall Parker Carlson
Attys.

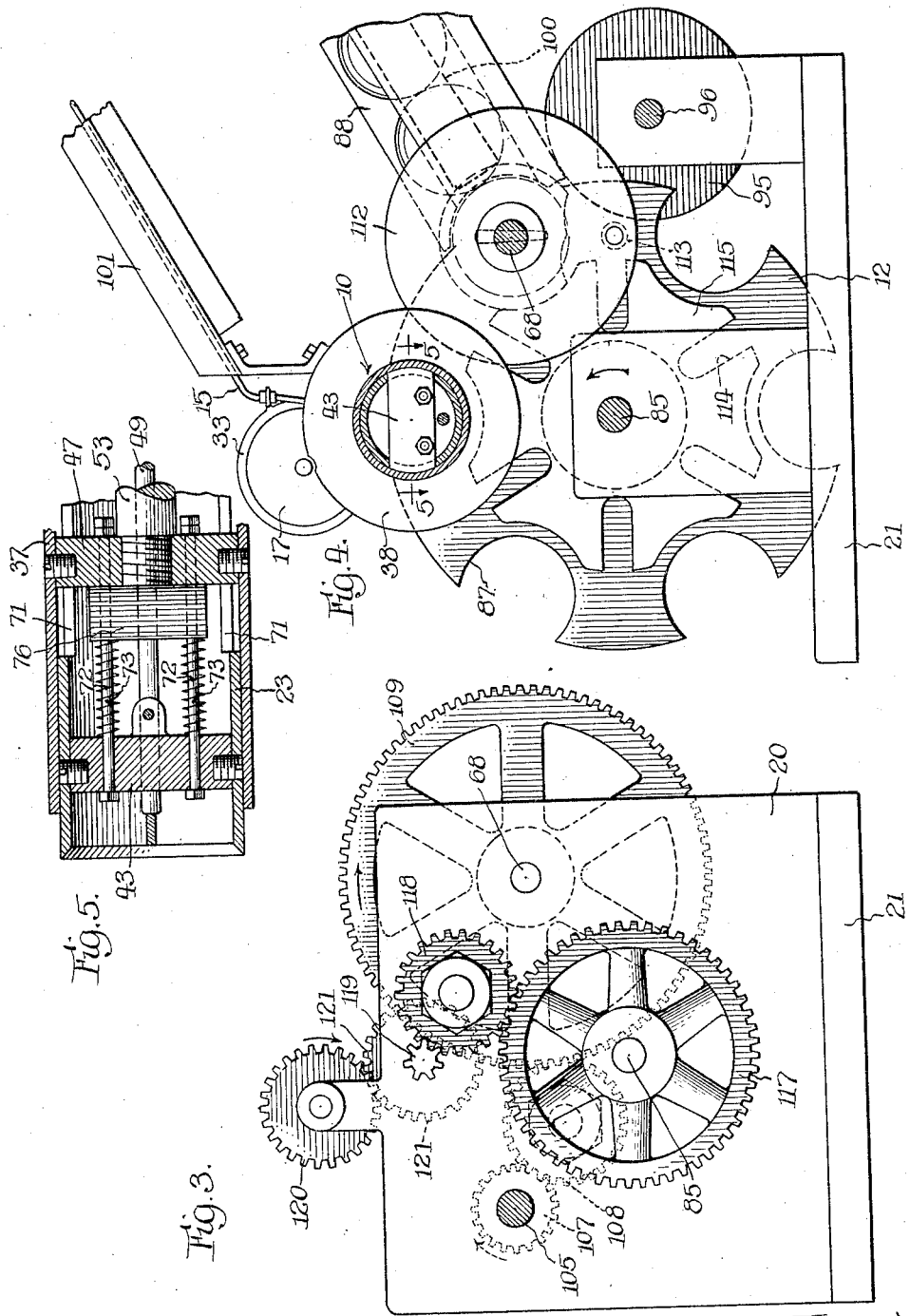

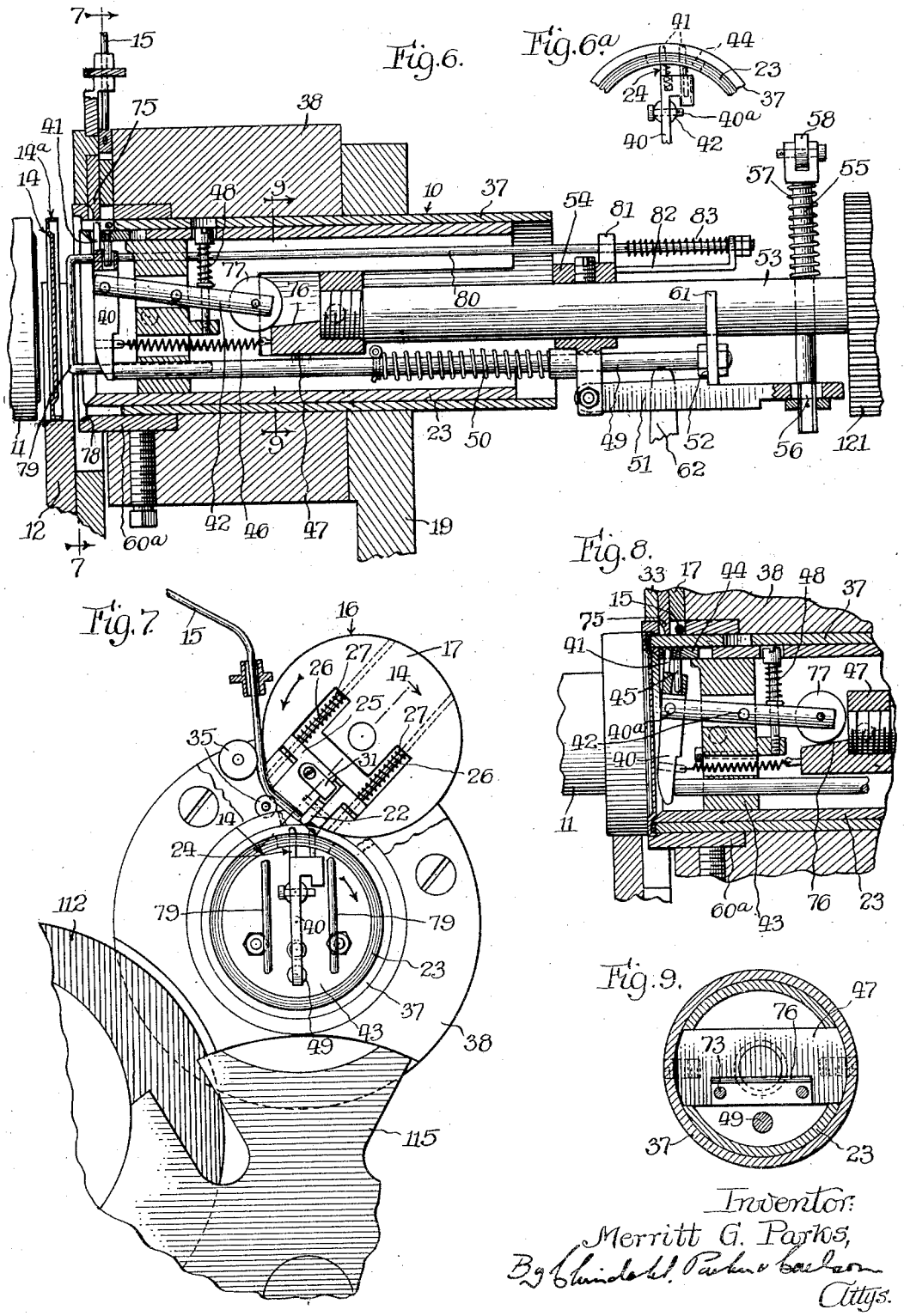

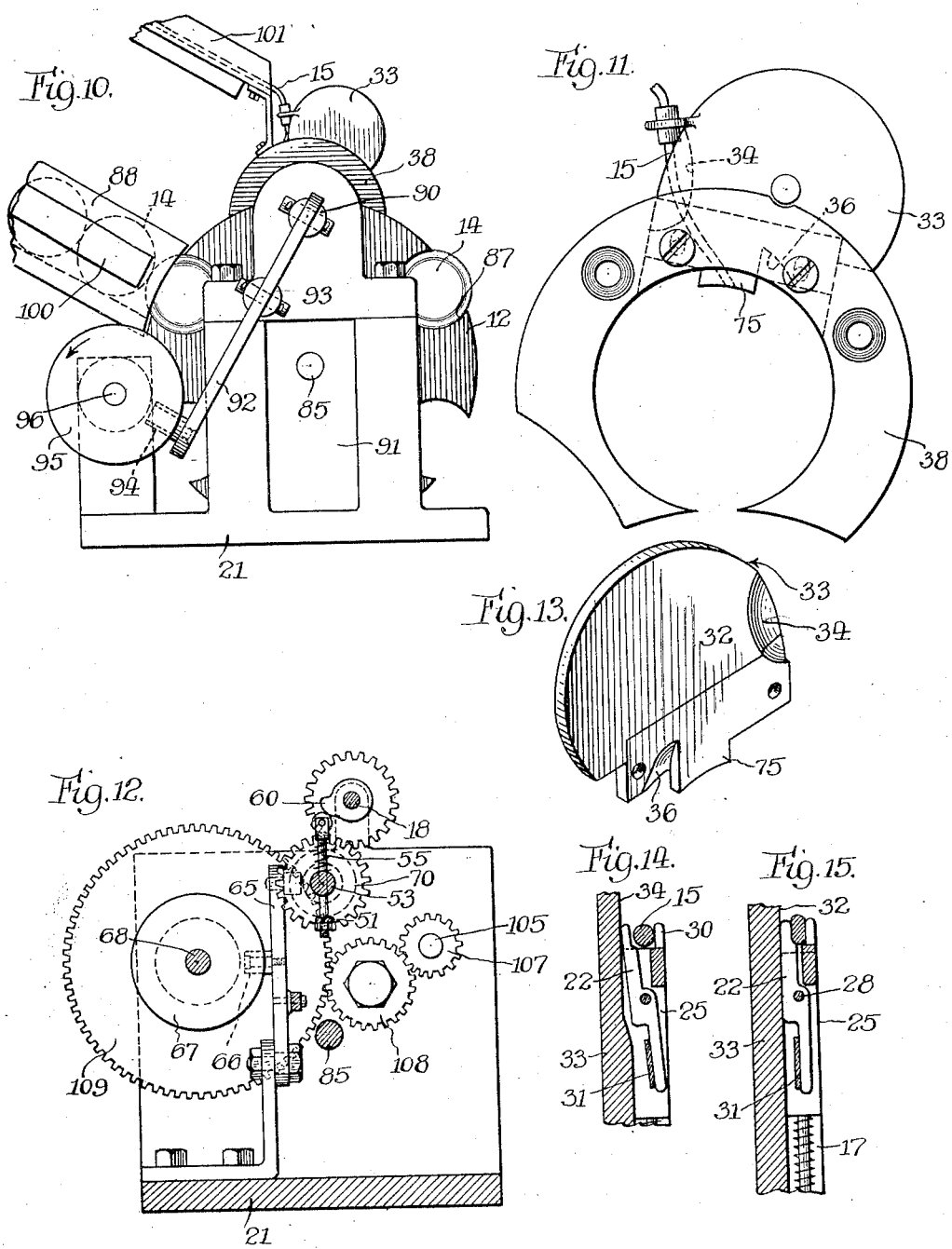

Patented Oct. 25, 1932

1,884,823

REISSUED

UNITED STATES PATENT OFFICE

MERRITT G. PARKS, OF GARY, INDIANA

MACHINE FOR FORMING AND APPLYING PLASTIC GASKETS TO JAR CAPS

Application filed October 20, 1930. Serial No. 489,886.

The invention relates generally to the manufacture of jar caps having plastic gaskets attached thereto, and more particularly it relates to a machine for forming and applying the gaskets to the caps.

The primary object of the invention is to provide a machine having a new and improved mode of operation whereby gaskets of raw rubber composition or other plastic material may be applied to jar caps quickly, effectively and uniformly, at a cost substantially lower than has heretofore been possible.

A further object is to provide a machine of the character indicated in which the gasket is made from an elongated strip or strand of plastic material which is applied in circular form to the cap, with the ends of the strand united and the material compressed to the desired shape in adhering relation to the cap.

Other objects and advantages will become apparent from the following description taken in connection with the accompanying drawings which illustrate a preferred embodiment of the invention. In the drawings:

Fig. 3 is a sectional view taken along the line 3—3 of Fig. 2, looking in the direction of the arrows.

Fig. 4 is a vertical sectional view taken along the line 4—4 of Fig. 1, looking in the direction of the arrows.

Fig. 5 is an enlarged fragmental plan section of the gasket forming and applying means, taken along the line 5—5 of Fig. 4.

Fig. 6 is an enlarged vertical sectional view taken through the gasket forming and applying means substantially along the line 6—6 of Fig. 2.

Figures 1, 2:
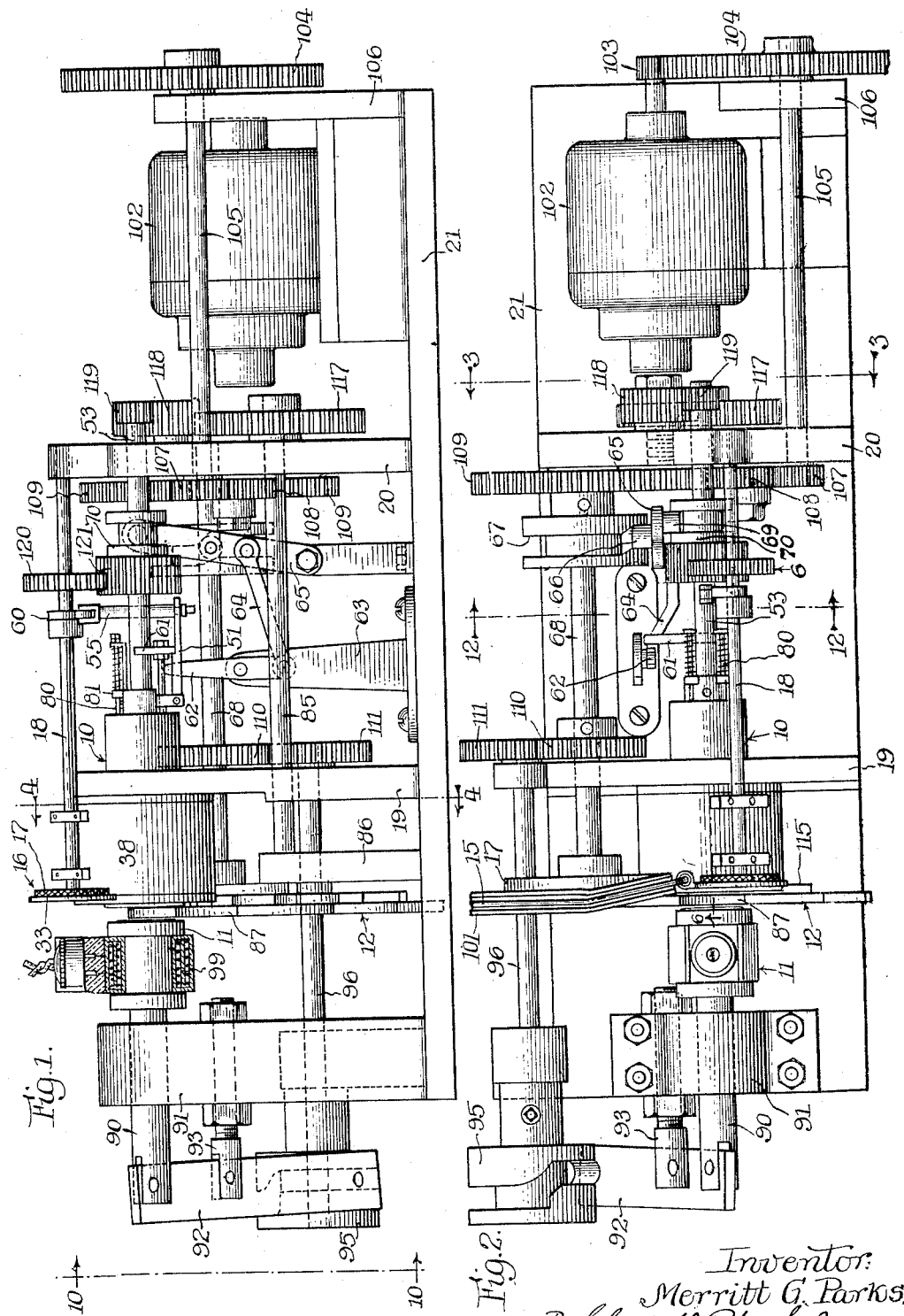
Figure 1 is a side elevational view of a machine embodying the invention in its preferred form.
Fig. 2 is a plan view of the machine.

Fig. 6ᵃ is a fragmental end elevational view of one of the clamps as viewed from the left in Fig. 6.

Fig. 7 is an end elevational view taken through a machine along the line 7—7 of Fig. 6 with certain parts of the machine removed.

Fig. 8 is a view similar to Fig. 6 showing the parts in the positions occupied upon the completion of the gasket applying operation.

Fig. 9 is a vertical sectional view taken along the line 9—9 of Fig. 6.

Fig. 10 is an end elevational view of the machine taken from the line 10—10 of Fig. 1.

Fig. 11 is an enlarged fragmental portion of Fig. 10.

Fig. 12 is a vertical section taken along the line 12—12 of Fig. 2.

Fig. 13 is a perspective view of the knife employed to shear the strand of the gasket material.

Figs. 14 and 15 are similar sectional views taken along the line 14—14 of Fig. 7 and showing the feeding clamp in its open and closed positions respectively.

Generally considered, the machine illustrated consists of a gasket-forming and applying device 10, supported in axial alinement with a reciprocable plunger 11, together with an indexing holder 12 operable to feed jar caps 14 one by one into a position between the plunger 11 and the forming and applying device 10 so that gaskets formed by the device may be pressed onto the caps 14 by coordinated approaching movements of the plunger and the device while the holder remains stationary.

*The gasket forming and applying mechanism*

In the machine shown herein, a strand 15 of gasket material, preferably of round cross section, is taken directly from a strand forming machine (not shown), and by a feeding mechanism 16 its end is placed in a forming means which forms the end portion of the strand 15 into an annulus suitable for use as a gasket. The annulus is then severed from the remainder of the strand and is pressed into position in a jar cap 14 in a manner such as to shape the gasket and unite the two ends of the severed strand.

The feeding means and the forming means are in the present case, both rotatable in character and are arranged to act in succession to draw the end portion of the strand over the desired path to form the annulus. Considered generally, the feeding means preferably comprises a disk 17 (Figs. 1, 2, 4, and 7) fixed on a shaft 18 mounted in standards 19 and 20 of the frame 21 and carrying a releasable feed clamp 22 (Figs 7, 14 and 15) for grasping and moving the end of the strand 15. As indicated by the arrow in Fig. 7, the feed clamp 22 on the disk 17 moves the end of the strand 15 along the adjacent periphery of an oppositely rotating coaxial mandrel 23. The latter in the present case, is cylindrical in form and therefore constitutes in part a circle forming means. This feeding of the strand by the disk 17 continues until the strand is within the range of a clamp 24 (Fig. 7) carried by the winding mandrel. After automatic operation of the clamp 24 so as to grasp the strand 15, the feed clamp 22 is released so that continued rotation of the mandrel 23 may draw the strand into circular form about the mandrel.

In order that the end of the strand 15 may be held close to the mandrel 23 and within the range of its clamp 24 as it is fed by the disk 17, the feed clamp 22 is carried on a slide 25 which is movable radially of the disk 17 as shown in Fig. 7 on rods 26, and is pressed radially outwardly of the disk 17 by springs 27 surrounding the rods 26. The clamp 22 is best shown in Figs. 14 and 15 and is in the form of a lever extending radially with respect to the disk 17 and pivoted at 28 upon the slide 25 so that its outer end is in opposed relation to a stationary finger 30 carried by the slide and forming the other member of the clamp. The clamp 22 is normally pressed to its open position, shown in Fig. 14, by a spring 31 acting on one end thereof, and is closed by movement of the opposite end of the clamp along a cam surface 32 formed on a stationary cam plate 33 which, in the present case, is in the form of a disk mounted on the frame of the machine at one side of the feed disk 17.

Rotational movement imparted to the disk 17 moves the feed clamp 22 toward the end of the strand 15 (Figs. 7 to 11) and the cutaway portion 34 of the cam surface 32 (Figs. 11, 13 and 14) along which the clamp moves, permits the clamp to be opened by the spring 31. A detailed view of the cam plate 33 is shown in Fig. 13, which is taken from the far side of the plate as shown in Fig. 11. This view shows the formation of the various cam surfaces. By the action of the springs 27, the clamp 22 is held in its outward radial position until the two opposed members 30 and 22 are positioned on opposite sides of the strand 15. To insure proper positioning of the strand, guide rollers 35 are positioned in opposed relation to the feed disk 17 and the clamp 22 is arranged to grasp the strand between the two guide rollers 35. The action of the cam surface 32 along which the clamp 22 moves causes the clamp to be closed until it has passed to a second cutaway portion 36 (Fig. 13) of the cam surface 32 which permits the clamp to open.

The mandrel 23 is mounted within a sleeve 37 for rotation therewith, the sleeve being rotatably mounted in a bearing head 38 of the frame 21. One end of the mandrel 23 (the left in Fig. 6) normally projects from the end of the sleeve 37 to provide a surface about which the strand 15 may be wound, and the clamp 24 is arranged to operate by pressing the strand against the end of the sleeve 37.

The clamp 24 is preferably mounted principally within the mandrel 23, which is of sleeve-like form to provide space for the clamp and its operating parts, and as shown herein the clamp comprises a movable member in the form of a lever 40 extending diametrically of the mandrel (Figs. 6, 7, and 8). One end of the lever 40 has a pair of spaced clamping fingers 41 formed thereon adapted to project through the mandrel 23 and upon pivotal movement of the lever 40, to press the strand 15 longitudinally of the mandrel into contact with the end of the sleeve 37.

The clamping lever 40 is pivoted at 40$^a$ intermediate its ends on one end of a lever 42, which for purposes which will hereinafter appear, extends longitudinally through and is pivoted to a transverse wall 43 in the mandrel. Thus by pivotal movement of the lever 40 about its pivot 40$^a$, the clamp is operated, and in the present case the clamping fingers 41 project through a plate 44 which is longitudinally slidable in the mandrel and which insures an unbroken surface in the mandrel at the point where the strand is wound. The clamping lever 40 is normally held in its open position by a spring 46 (Fig. 6) extending through the wall 43 and connected to the lever 40 and to a cross head 47 which is fixed to the outer sleeve 37 in a manner which will later appear.

To pivot the clamping lever 40 to its operative position at the desired point in the rotating movement of the mandrel 23, a rod 49 is employed which is slidable longitudinally through the wall 43 and into contact with the inner end of the lever 40. A spring 50 acting on the rod 49 normally presses the rod toward the lever 40 but its movement is restrained by a trigger 51 engaging an abutment 52 on the rod and arranged to be released at a predetermined point in the rotative movement of the mandrel. A shaft 53 connected to the cross head 47 and serving to rotate the mandrel, also serves to support the trigger 51, through the medium of a collar 54 fixed on the shaft. The trigger 51, which is pivoted on the collar 54 extends longitudinally of the shaft 52 and is operated by a plunger 55 which projects diametrically through the shaft 53.

One end of the plunger 55 is connected at 56 to the end of the trigger 51 so that it may shift the trigger in either direction, and a spring 57 surrounding the other end of the plunger 55 acts through the plunger to move the trigger 51 yieldingly toward its operative position shown in Fig. 6. In the opposite rotative movement of the shafts 18 and 53, a cam roller 58 mounted on the end of the plunger 55 is engaged by a cam 60 on the shaft 18 (Figs. 1 and 12) to release the trigger 51 and permit movement of the rod 49 so as to close the clamp 24.

After the clamp 24 has been closed upon the strand, and the clamp 22 released, the mandrel completes its revolution to form an annulus from the strand 15 about the mandrel 23. The rotative movement of the mandrel is then stopped with the annulus positioned in an annular recess or groove, best shown in Fig. 6, which is formed between the mandrel, the end of the sleeve 37 and a stationary collar 60$^a$ which surrounds and projects past the end of the sleeve 37. This groove serves to hold the annulus in the desired form, and the clamp 24 is therefore released at this time. This is accomplished by means acting to withdraw the rod 49 to a position wherein it is held by the trigger 51.

As shown in Figs. 1, 2, and 6, this means comprises a plate 61 fixed on the rod 49 so as to be engaged by the end of a movable lever 62 to withdraw the rod to a position wherein the abutment 52 is behind the shoulder of the trigger 51. The lever 62 is mounted on a bracket 63 (Fig. 1) and is actuated through a link 64 connected to a similarly pivoted lever 65. The lever 65 carries a cam roller 66 engaging a grooved cam 67 fixed on a shaft 68 which rotates in timed relation to the rotative movement of the mandrel 23.

The sleeve 37 is utilized to move the gasket along the mandrel 23 and to press it into position on the cap 14, and for this purpose the mounting of the sleeve in the bearing 38 is arranged to permit longitudinal movement of the sleeve. Such movement is obtained through a roller 69 (Fig. 2) mounted on the lever 65 and engaging a grooved collar 70 fixed on the mandrel shaft 53. In such movement of the sleeve 37, the mandrel 23 moves therewith until the end of the mandrel 23 strikes the cap 14 which is backed up by the plunger 11 and thereafter the sleeve continues its movement independently of the mandrel. Such relative movement is permitted by a yielding lost motion connection, best shown in Fig. 5 of the drawings, wherein it will be seen that cross head 47 extends through longitudinal slots 71 formed in the mandrel 23. The mandrel 23 is normally projected longitudinally from the end of the sleeve 37 by springs 72 acting between the cross head 47 and the transverse wall 43 of the mandrel, the springs 72 being mounted about rods 73 which extend through the cross head 47 and the wall 43 and have heads thereon which limit the movement of the parts by the springs 72.

During the initial part of the advancing movement of the sleeve 37, the annulus formed from the strand 15 is severed from the remainder of the strand by a knife 75 (Figs. 6, 8, 11, and 13) positioned closely adjacent to the upper surface of the sleeve 37 (Fig. 11) and acting as a shearing edge past which the annulus is forced by the sleeve 37. The portion of the strand 15 which is held by the feed clamp 22 extends along the face of the knife at an angle to the cutting edge of the knife and since this portion can not pass the knife 75, it will be apparent that the annular portion of the strand which is being moved by the sleeve 37, will be sheared from the held portion of the strand so as to leave angularly disposed ends on both portions of the strand. It will be noted that in the present case the knife is secured on the stationary plate 33 (Fig. 11) and the body of the knife, therefore, forms a part of the cam surfaces 32, 34, and 36 (Fig. 13).

Since the sleeve 37 must move longitudinally of the mandrel to press the strand onto the cap 14, the clamping fingers 41 of the lever 40 are arranged to slide radially through the plate 44, into an out-of-the-way position shown in Fig. 8, and in such movement the lever 40 is guided by a pin 45 projecting radially inwardly from the plate 44 and loosely engaging an opening in the lever. The withdrawing movement of the lever 40 is obtained by pivotal movement of the lever 42 upon which the lever 40 is mounted, against the action of a spring 48 which normally tends to move the lever 42 so as to project the fingers 41 outwardly of the mandrel to the position shown in Fig. 6.

After the pointed end edge of the mandrel 23 has moved into abutment with the cap 14, the continued movement of the cross head 47 serves to withdraw the fingers 41 of the clamp 24 radially into the mandrel. This is accomplished by a cam 76 formed on the cross head 47 and arranged to engage a cam roller 77 on the adjacent end of the lever 42 to move the lever against the force of the spring 48 to the position shown in Fig. 8. Thus, the path of the sleeve 37 is cleared and its movement is continued until the annulus is pressed within the flange 14$^a$ of the cap 14.

It will be noted that the advancing movement of the plunger 11 presses the cap 14 positively toward the yielding mandrel 23 until the flange 14$^a$ of the cap is positioned within and is laterally supported by the sides of an annular recess 78 formed in the outer end of the collar 60$^a$ (Figs. 7 and 8), and while it is thus held the annulus is compressed to rectangular cross sectional form between the cap 14, its flange 14$^a$, the mandrel 23 and the end of the sleeve 37. It will be seen that the annular recess 78 provides an annular space in which the flange 14ª may be placed with its inner surface alined with the inner surface of the collar 60ª, and the compressing action of the sleeve 37 widens the strand 15 to fill the space between the flange 14ª and the mandrel 23. Such compression serves effectively to join the adjacent, angularly cut ends of the strand, and a continuous annular gasket is thereby formed.

To remove the cap 14 from the recess 78 upon completion of the attaching operation, a pair of U-shaped rods 79 are mounted in the transverse wall 43 (Figs. 6 and 7), with their cross members disposed on opposite sides of the axis of the mandrel 23 and adjacent the clamp 24. One side member 80 of each rod 79 extends longitudinally through the mandrel 23 and out of the other end thereof (Fig. 6), and both are guided in ears 81 on the collar 54. Extending from the collar is a bracket 82 between which and the rods 79 a pair of springs 83 are arranged to act to press the rods toward the cap 14 positioned at the other end of the mandrel.

Thus, when the plunger 11 is withdrawn, the rods 79 push the cap 14 away from the mandrel 23 and into the indexing holder 12 so that the finished cap will be moved out of the machine as a new cap is moved into position.

In the withdrawing movement of the sleeve 37, the mandrel resumes its normal position shown in Figs. 5 and 6, and the fingers 41 of the clamp 24 are projected through the mandrel so as to be ready for the next clamping operation.

The indexing cap holder

The indexing holder 12 is best shown in Figs. 4 and 6 and comprises a disk of substantial thickness mounted on the overhanging end of a shaft 85 mounted in a bracket 86 (Fig. 1) beneath the forming device 10 and extending through the standard 19 of the frame. At equally spaced points about its periphery, the disk 12 has a plurality of segmental pockets 87 formed therein opening outwardly of the disk and of sufficient width to permit a cap 14 to enter edgewise thereinto. The disk 12 is moved intermittently to position the pockets 87 successively between the mandrel 23 and the plunger 11, the uppermost pocket on the disk being the one which is positioned adjacent the mandrel. As shown in Fig. 4, the disk 12 is moved in a counterclockwise direction, and the caps 14 are fed to the pockets 87 of the disk through an inclined chute 88 which discharges a vertically positioned cap 14 into each pocket just before it reaches the uppermost position. It will be seen that the open lower end of the chute 88 is located opposite a position in which the pockets 87 are stopped in the intermittent movement of the disk, so that ample opportunity is provided for the lower cap 14 to move into the pocket.

After a gasket has been applied to the cap 14 opposite the mandrel, that cap is moved by the holder 12 toward the left side of the machine (Fig. 4) and is dropped from its pocket 87.

The plunger 11 and its mounting

The reciprocating plunger 11 is mounted on one end of a shaft 90 (Figs. 1 and 2) which is slidable through a standard 91 of the frame and is actuated by a lever 92 pivoted at one end to the other end of the shaft 90. Intermediate its ends, the lever 92 is pivoted on an adjustable support 93 carried by the standard 91, while at its other end it carries a roller 94 engaging a grooved cam 95 mounted on the end of a constantly rotating shaft 96. By adjusting the support 93, the stroke of the plunger 11 may be adjusted to bring the cap 14 accurately to the desired position.

If desired, the plunger 11, as well as the chute 88 may be heated by suitable electric heaters 99 and 100 and the strand 15 may be drawn through an electrically heated guideway 101 (Fig. 4) so as to render the strand more easily workable and insure firm adherence of the gaskets to the caps.

The driving mechanism

All of the parts of the machine are preferably driven in timed relation to each other from a single power source such as a motor 102 mounted on the bed 21 with a pinion 103 on its shaft engaging a gear 104 carried on a horizontal shaft 105, which is mounted in a standard 106 and extends through the standard 19. On its end adjacent the standard 19, the shaft 105 carries a gear 107 which, through an idler 108, drives a gear 109 fixed on the shaft 68.

The shaft 68 is rotated once for each gasket forming operation and drives the shaft 96 at the same rate through gears 110 and 111 (Figs. 1 and 2) whereby to reciprocate the plunger 11 once for each revolution of the shaft 68, it being understood that the cam 95 has but a single lobe.

The constantly rotating shaft 68 also drives the indexing work holder 12, through the medium of a Geneva movement, having a disk 112 fixed to the shaft 68, with a pin 113 (Fig. 4) adapted to engage radial slots 114 in a Geneva wheel 115 which is fixed on the shaft 85 of the work holder. The number of slots 114 in the Geneva wheel 115 corresponds to the number of cap-receiving pockets 87 so that each rotation of the shaft 68 moves a new pocket 87 into position opposite the mandrel 23.

The desired intermittent rotary movement of the feed disk 17 and the mandrel 23 is preferably obtained from the shaft 85 upon which the indexing holder 12 is mounted. To this end the shaft 85 is extended through the standard 20 and carries a gear 117 (Figs. 1, 2 and 3) which through an idler 118 drives a gear 119 on the shaft 53. The idler 118 is preferably made wide enough to permit longitudinal movement of the shaft 53 in the gasket applying operation.

The gears 117, 118, and 119 are proportioned to impart one complete revolution to the mandrel 23 during each advancing movement of the work holder 12, and it will be seen that this rotation of the mandrel takes place while the movement of work holder is taking place.

The feed disk 17 is oppositely rotated in timed relation to and at the same speed as the shaft 53 by meshing gears 120 and 121 fixed respectively on the two shafts, and the gear 121 is made of sufficient thickness to maintain the two gears in mesh during longitudinal movement of the shaft 53.

Operation

A strand 15 of pre-formed gasket material, preferably of round cross section, is fed from a strand forming machine (not shown) through the chute 101 to the guide rollers 35 adjacent the intermittently rotating feed disk 17. In the rotation of the disk 17, the clamp 22 carried thereby is opened, and as the clamp passes the guide rollers 35, it is closed so as to grasp the strand and draw it toward the adjacent periphery of the oppositely rotating mandrel 23.

The normal stopped position of the feed disk 17 is such that the end of the strand 15 is adjacent to the mandrel 23 as shown in Fig. 7, while the fingers 41 of the clamp 24 project through the mandrel adjacent to the end of the strand. When opposite rotation of the feed disk 17 and the mandrel is started, the clamp 22 moves across the adjacent periphery of the mandrel, and due to outward radial movement of the clamp 22 by the springs 27, the end of the strand is held close to the mandrel 23 for an appreciable distance. During such movement of the strand 15, its end is automatically secured to the mandrel 23 by the fingers 41 of the clamp 24 which press the strand against the adjacent end of the sleeve 37.

It will be recalled that the clamp 24 is normally projected through the mandrel 23 by the spring 48, and is held in its unclamped position by the spring 46, and its automatic clamping movement is obtained through the action of a cam 60 upon the plunger 55 which releases the trigger 51 (Fig. 6) and permits the spring pressed rod 49 to strike and actuate the lever 40.

After the clamp 24 has been closed, the cut away section 36 of the cam surface 32 permits the clamp 22 to be opened so as to release the strand from the feed disk 17 and permit it to be drawn by the clamp 24 into a circle in the space between the mandrel 23, the collar 60ª and the sleeve 37.

Just prior to the completion of a full revolution by the mandrel 23, the clamp 22, which is then open, is actuated by movement across the cam surfaces 34, 32, so as to clamp the strand 15 to the feed disk 17 which holds the strand 15 while it is severed from the annulus formed about the mandrel.

The strand 15 is severed by advancing movement of the sleeve 37 which acts as a shearing member in cooperation with the knife 75 to cut the strand at an angle close to the clamp 22 which is then stationary.

As the sleeve 37 advances, (to the left in Fig. 6) the clamp 24 is opened by withdrawal of its actuating rod 49, to a position wherein it is held by the trigger 51, this being accomplished by the lever 62 (Fig. 1) operated from the lever 65 which reciprocates the sleeve 37. At substantially the same time, the projecting fingers 41 of the clamp 24 are drawn radially inwardly of the mandrel by the action of the cam 76 which moves with the sleeve 37 and acts to rock the lever 42 upon which the clamp 24 is mounted.

During such advancing movement of the sleeve 37, the mandrel 23 moves longitudinally with the sleeve by reason of the springs 72 (Fig. 5) and approaches the cap 14 which is then being advanced toward the mandrel by movement of the plunger 11. While the cap 14 is being positioned by the cooperative action of the plunger 11 and the mandrel 23 and the recess 78, the advancing movement of the sleeve 37 continues, and after the positioning of the cap is completed the annular strand is compressed onto the cap into rectangular cross sectional form with united ends, as shown in Fig. 8.

The withdrawing movement of the plunger 11 and the sleeve 37 then takes place, and the finished cap is moved back into the pocket 87 of the indexing holder 12 by the action of the spring pressed rods 79, the springs 83 of which have been compressed during the gasket applying operation.

As the sleeve 37 is withdrawn, the springs 72 move the mandrel 23 to the left relatively to the sleeve, so that the end of the mandrel projects from the sleeve as shown in Fig. 6. This relative movement withdraws the cam 76 and permits the spring 48 to project the clamping fingers 41 outwardly through the mandrel.

The mechanism is then conditioned for another rotative movement to form another annulus from the strand 15, and such movement occurs automatically due to the driving connection between indexing holder 12 and the strand feeding and circle forming devices.

During such rotative movement of the mandrel to form another annulus, the work holder 12 moves the finished cap 14 out of the machine and advances another cap from the chute 88 to a position between the mandrel and the plunger 11, so that the annulus may be pressed thereon in the next reciprocation of the sleeve 37.

From the foregoing it will be apparent that the invention provides a fully automatic machine for forming gaskets and applying them to jar caps and that by forming the gaskets from a pre-formed strand of material, uniformity of the gaskets is insured. It will also be seen that the machine is adapted for operation at high speeds since the form of the gasket material is changed only slightly by the machine.

The method of making and applying gaskets and the novel gasket construction herein disclosed is claimed in my copending application, Serial No. 499,908, filed December 4, 1930.

I claim as my invention:

1. A machine for forming and applying plastic gaskets to jar caps comprising, in combination, means operable to form one end of a strand of gasket material into a circle, means operable to sever the circularly formed portion of the strand from the remainder of the strand, a clamp operable to hold said strand adjacent to said circular portion while said severing operation is performed, a cap presenting device, and means operable to press the circle of gasket material onto a cap presented by said device.

2. A machine of the character described comprising a clamp adapted to grasp the end of a strand of plastic material, means to move said clamp in a circular path to form the strand into an annulus, means to release the clamp after the annulus has been formed, and means operable to press the annulus onto a jar cap.

3. A machine of the character described comprising a pair of members having an annular space therebetween to receive a strand of gasket material arranged in circular form about the inner one of said members with its ends substantially in abutment, means to so arrange a strand in said space, the outer one of said members being annularly recessed at one end to receive the flange of a cap with the inner surface of the flange alined with the inner surface of said outer member, and a plunger of cylindrical form movable through said space to force said circular strand onto a jar cap held in abutment with said members whereby to widen said strand as determined by the space between said flange and said inner member and press its ends together to form a continuous annular gasket on the cap.

4. A machine of the character described having a pair of members with an annular space therebetween to receive a strand of gasket material arranged in circular form about the inner one of said members with its ends substantially in abutment, the outer one of said members being annularly recessed at one end to provide space to receive the flange of a jar cap with the inner surface of said flange alined with the inner surface of said outer member, and a sleeve-like plunger movable through the space between said members to force said strand into abutment with a flanged jar cap having its flanged edge within the annular recess in said outer member, said plunger acting to widen said strip as determined by the space between said flange and said inner member and to join the adjacent ends of the strand to form a gasket.

5. A machine of the character described having a pair of members providing an annular space therebetween to receive a strand of gasket material arranged in circular form about the inner one of said members with its ends adjacent to each other, means to hold a jar cap in abutment with said concentric members, a plunger movable through said space to compress the strand onto a cap held against said members by said means, said inner member having a longitudinal opening therethrough, and means movable in said opening longitudinally of said members and operable to force the cap away from said members when said holding means is removed.

6. A machine of the character described comprising, in combination, a pair of members providing an annular space therebetween opening longitudinally of said members and adapted to receive a strand of gasket material arranged in circular form about the inner one of said members, a cap presenting member adapted to hold a jar cap in abutment with said members and in closing relation to said space, a plunger movable through said space to press the strand onto such a cap, an element movable longitudinally within the inner one of said members and operable to move a cap longitudinally away from said members when said cap presenting member is withdrawn, and a spring acting on said element arranged to be compressed by a cap as it is moved toward said members.

7. A machine of the character described comprising, in combination, a rotatably mounted mandrel, a sleeve surrounding said mandrel and movable longitudinally with respect thereto, means for intermittently rotating said mandrel through one revolution, a clamp for securing one end of a strand of gasket material to said mandrel to form a circle from said strand during rotation of the mandrel, and means for reciprocating said sleeve to move the circle of gasket material longitudinally of said mandrel to compress the material against a jar cap.

8. A machine of the character described comprising a rotatably mounted mandrel, a sleeve surrounding said mandrel and movable longitudinally with respect thereto, means for intermittently rotating said mandrel through one revolution, a clamp for securing one end of a strand of gasket material to said mandrel to form a circle from said strand during rotation of said mandrel, reciprocating means for moving said sleeve to compress the circle of gasket material against a jar cap, and means acting as an incident to the advancing movement of said sleeve to release said clamp and move the same to an inoperative out-of-the-way position.

9. A machine of the character described comprising a rotatably mounted mandrel, a sleeve surrounding said mandrel and movable longitudinally with respect thereto, means for intermittently rotating said mandrel through one revolution, a clamp for securing one end of a strand of gasket material to said mandrel to form a circle from said strand during rotation of said mandrel, reciprocating means for moving said sleeve to compress the circle of gasket material against a jar cap, and means operating as said sleeve is advanced to move said clamp radially inwardly into said mandrel.

10. A machine of the character described comprising, in combination, a rotatably mounted mandrel, a sleeve surrounding said mandrel and movable longitudinally thereon, means for intermittently rotating said mandrel through one revolution, a clamp mounted within said mandrel and extending outwardly through the surface of said mandrel, said clamp being movable longitudinally of said mandrel to press a strand of gasket material against the end of said sleeve and also being movable radially inwardly of said mandrel to clear the path of said sleeve so that it may be moved longitudinally of the mandrel, means operating in the initial portion of a rotative movement of said mandrel to close said clamp, means for reciprocating said sleeve, and means acting as said sleeve is moved toward said clamp to withdraw the clamp radially inwardly into said sleeve.

11. A machine of the character described comprising, in combination, a rotatably mounted mandrel, a sleeve surrounding said mandrel and movable longitudinally thereon, means for rotating said mandrel, a clamp movable longitudinally of said mandrel to press a strand of gasket material against the end of said sleeve, yielding means operable at a predetermined point in the rotation of said mandrel to close said clamp, said clamp being mounted for movement out of the path of said sleeve, and means operating as said sleeve is moved toward said clamp to withdraw said clamp from the path of said sleeve.

12. A machine of the character described having a rotatable mandrel, a movable clamp mounted on said mandrel for rotation therewith, a spring normally holding said clamp in one position, a spring pressed member mounted on said mandrel and operable to move said clamp to its other position, a trigger operable to hold said member in an inoperative position, means operable to move said trigger and release said member for operation, and means operable to restore said member to its inoperative position.

13. A machine of the character described comprising a rotatable mandrel, sleeve surrounding said mandrel and movable longitudinally thereon, a clamp within said mandrel comprising a lever extending diametrically thereof with a clamping finger projecting through the outer surface of the mandrel, a member upon which said lever is pivoted, said member being mounted for movement diametrically of said mandrel to move said clamping finger through said mandrel, means to pivot said lever, and means operable to shift said member.

14. A machine of the character described comprising a rotatable mandrel, sleeve surrounding said mandrel and movable longitudinally thereon, a clamp within said mandrel comprising a lever extending diametrically thereof with a clamping finger projecting through the outer surface of the mandrel, a member upon which said lever is pivoted, said member being mounted for movement diametrically of said mandrel to move said clamping finger through said mandrel, a rod mounted within said mandrel for sliding movement into abutment with said lever to pivot the same in one direction, a spring for moving said lever in the other direction, a spring acting on said rod to move it to its operative position, means controlling the action of said rod upon said lever, and cam means acting in the longitudinal movement of said sleeve to control the position of said member.

15. A machine of the character described comprising a rotatable mandrel, sleeve surrounding said mandrel and movable longitudinally thereon, a clamp within said mandrel comprising a lever extending diametrically thereof with a clamping finger projecting through the outer surface of the mandrel, a member upon which said lever is pivoted, said member being mounted for movement diametrically of said mandrel to move said clamping finger through said mandrel, means operating in the rotative movement of said mandrel to actuate said lever, and means connected to said sleeve and operating on said member during movement of said sleeve along said mandrel to control the position of said member.

16. A machine of the character set forth having a winding mandrel, a clamp thereon, a feed device operable to present the end of a strand of plastic material to said clamp, means for rotating the mandrel through one revolution, and means for severing the strand after one revolution to form a ring, the feed device being adapted to hold the remainder of the strand after the severing operation.

17. A machine of the character described having a winding mandrel, a clamp thereon, a feed disk having a clamp thereon adapted to grasp the end of a strand of plastic material to feed the same to the clamp on said mandrel, means to rotate said mandrel and said feed disk each through one revolution in opposite directions, and means for severing the strand after formation of a ring about the mandrel, the clamp on said feed disk being adapted to hold the remainder of the strand after the severing operation.

18. A machine of the character described comprising a rotatable mandrel, a sleeve surrounding and rotating with said mandrel and movable longitudinally of said mandrel, means for rotating said mandrel, means for reciprocating said sleeve, a clamp operable to secure the end of a strand of gasket material to said mandrel whereby to form a circle from said strand in the rotation of the mandrel, and means for opening and closing said clamp at predetermined points in the movement of said sleeve.

19. A gasket forming and applying machine having a rotatable mandrel, a sleeve surrounding said mandrel and movable longitudinally thereof, a clamp on said mandrel for grasping a strand of gasket material, said clamp being positioned during its operation in the path of reciprocation of said sleeve, means for operating said clamp, and means for moving it out of the path of said sleeve.

20. A machine of the character described comprising, in combination, means including a first clamp operable to grasp the end of a strand and movable in a circular path to form the strand into an annulus, a strand feeding device comprising a feeding clamp movable for a short distance along the path of said first clamp to move the end of a strand into the clamping range of said first clamp, and means for automatically operating said clamps to transfer the control of the strand from said feeding clamp to said first clamp during feeding movement of the strand.

21. In a gasket forming machine, the combination of a rotatable mandrel and rotatable feed disk mounted on parallel axes with the peripheries adjacent to each other, means to rotate the mandrel and the feed disk simultaneously in opposite directions in intermittent movements of one revolution each, guide rollers mounted in opposed relation to the periphery of the feed disk over which a strand of insulation material may move, a feed clamp on said disk adapted to grasp such a strand, means operable to close said feed clamp upon the strand as the clamp passes said rollers so as to draw said strand along the periphery of said mandrel, a second clamp on said mandrel, means operable in the rotation of said mandrel to close said clamp upon the strand as it is advanced by said feed clamp, means operable upon completion of the revolution of the mandrel to open said second clamp, and means to sever the circularly formed portion of the strand from the remainder of the strand.

22. A gasket forming machine comprising a mandrel and a feed disk mounted on parallel axes for simultaneous rotation in opposite directions with their peripheries adjacent, a first clamp on said mandrel, a feed clamp mounted on said feed disk for limited movement radially thereof, spring means acting to move said feed clamp outwardly of said disk to hold said feed clamp against said mandrel for a substantial distance, means operable to close said first clamp on a strand presented by said feed clamp, and means subsequently operable to release said feed clamp.

23. In a machine of the character described, the combination of intermittently rotatable means operable in each rotation to form a strand of gasket material into an annulus, means reciprocable while said rotatable means is stationary to move the annulus longitudinally of the axis of said rotatable means, an indexing holder for moving caps one by one into the path of said reciprocating means, and driving mechanism operable simultaneously to index said holder and rotate said first mentioned means.

24. A gasket forming and applying machine comprising, in combination, means operable to form an annular gasket, a stationary sleeve through which the formed gasket may be moved, a plunger for so moving the gasket, said member having an annular recess in its end in which a jar cap may be positioned and seated in the path of the gasket, means operable to position jar caps one by one in alinement with said recess, a second plunger operable to move each cap into said seat, means for reciprocating said plungers toward and away from each other in timed relation, and means operable to move each cap from its seated position in said recess.

25. A gasket forming and applying machine comprising a cylindrical member, means operable to form a plastic annular gasket about said member, means operable to move the gasket longitudinally of said member, a plunger alined with and movable toward said member, an intermittently movable cap holder positioned between said member and said plunger, said holder having a plurality of pockets formed therein each adapted to hold a jar cap, said pockets being arranged to permit said plunger to be moved therethrough, means operable to reciprocate said plunger to move a cap from the alined pocket into contact with said member while a gasket is pressed onto said cap, and means operable upon withdrawal of said plunger to return the cap to the pocket.

26. A gasket applying machine comprising movable means for pressing a gasket onto a cap, a seat in which a cap may be positioned while the gasket is applied, a plunger for moving caps into said seat, and a cap supplying device comprising a disk positioned in a vertical plane with its upper portion between said means and said plunger, said disk having a plurality of equidistantly spaced pockets formed therein opening through the disk and through the periphery thereof, means to index said disk to bring said pockets successively into a position between said means and said plunger, and an inclined runway terminating at the periphery of the disk and arranged to discharge a cap into each pocket as it is moved upwardly toward said position.

In testimony whereof, I have hereunto affixed my signature.

MERRITT G. PARKS.